United States Patent [19]
Walz et al.

[11] 4,390,688
[45] Jun. 28, 1983

[54] WATER-DILUTABLE POLYESTER, PROCESS FOR THE PREPARATION THEREOF AND THE USE THEREOF

[75] Inventors: Gerd Walz, Wiesbaden; Thaddäus Wirth, Heidenrod-Wisper; Walter Sprenger, Dieburg, all of Fed. Rep. of Germany

[73] Assignee: Hoechst Aktiengesellschaft, Frankfurt am Main, Fed. Rep. of Germany

[21] Appl. No.: 357,571

[22] Filed: Mar. 12, 1982

[30] Foreign Application Priority Data

Mar. 14, 1981 [DE] Fed. Rep. of Germany ....... 3109968
Aug. 22, 1981 [DE] Fed. Rep. of Germany ....... 3133319

[51] Int. Cl.³ .................... C08G 63/54; C08L 63/00
[52] U.S. Cl. .................... 528/295.3; 525/119; 525/438; 525/443; 528/296; 528/297; 523/400
[58] Field of Search .............. 528/295.3, 296, 297; 525/438, 443, 119; 523/400

[56] References Cited

U.S. PATENT DOCUMENTS 3,766,118 10/1973 Albers et al. ............. 528/296
3,957,709  5/1976 Holzrichter et al. ........ 525/438
3,960,979  6/1976 Khanna .................... 525/438
4,007,146  2/1977 Ishizuka et al. ........... 528/296
4,148,772  4/1979 Marchetti et al. .......... 525/438
4,179,420 12/1979 Laganis .................... 528/296
4,240,938 12/1980 Kraft et al. ............... 525/119

Primary Examiner—Lucille M. Phynes
Attorney, Agent, or Firm—Hammond & Littell, Weissenberger and Muserlian

[57] ABSTRACT

A water dilutable polyester having a good resistance to hydrolysis based on
  (A) at least one dicarboxylic acid unit,
  (B) at least one polycarboxylic monoanhydride and
  (C) at least one alcohol component containing at least dihydric alcohol,
the COOH groups of the polyester being at least partially present in the form of salts with amine, characterized in that the polyester is also derived from
  (D) at least one epoxy compound which contains at least two oxiran rings and is selected from the group consisting of epoxidized fatty acids, derivatives thereof and epoxidized aliphatic hydrocarbons or mixtures thereof with up to 30% of monoepoxides, the percentage being based on the epoxy groups, and in that the polycarboxylic monoanhydride (B) is incorporated in the form of a half ester and is other than phthalic anhydride and maleic anhydride.

The invention also relates to a process for the preparation of such polyester, its use in a coating composition and to articles coated with such coating compositions.

11 Claims, No Drawings

WATER-DILUTABLE POLYESTER, PROCESS FOR THE PREPARATION THEREOF AND THE USE THEREOF

This invention relates to water-dilutable polyesters, their preparation and their use as binders.

Water-dilutable polyesters, the free carboxyl groups of which are converted into salts with amine or ammonium bases, are already known. These polyesters are used in conjunction with water-dilutable amine resins, e.g. melamine and/or urea resins, to form thermosetting coating materials. Systems of this kind generally contains a high proportion of organic solvents and are therefore not very acceptable from an environmental point of view.

On the other hand, aqueous polyester resin solutions containing a relatively small amount of organic solvent are known. However, these systems have only a limited shelf life owing to their susceptibility to hydrolysis. Moreover, all the aqueous systems of polyesters known hitherto have the disadvantage that, when applied to substrates by spraying, they can only be processed to form bubble-free coatings when applied in small layer thicknesses.

Moreover, aqueous dispersions of polymers, e.g. acrylic polymers containing hydroxyl groups, are known which may be used in conjunction with aqueous amine resins, e.g. melamine resins of the hexamethoxymethylmelamine type or the like, to form stoving enamels. However, these compositions can only be processed with relatively small amounts of pigment to form glossy coatings, owing to their poor pigment wetting properties. These systems also require a large proportion of organic solvents to ensure good flow properties, pigment wetting and other favourable coating properties. Therefore, they also lead to pollution of the environment.

It is therefore desired to provide a water-dilutable system which avoids the above disadvantages.

According to the present invention there is provided a water-dilutable polyester having a good resistance to hydrolysis based on (A) at least one dicarboxylic acid unit,
(B) at least one polycarboxylic monoanhydride and
(C) at least one alcohol component which contains at least one at least dihydric alcohol, the COOH groups of the polyester being at least partially present in the form of salts with amines, characterised in that the polyester chemically is also derived from
(D) at least one epoxy compound containing at least two oxiran rings and selected from the group consisting of epoxidised fatty acids, derivatives thereof and epoxidised aliphatic—which term shall include cycloaliphatichydrocarbons-either alone or in admixture or mixtures thereof with monoepoxides, preferably up to 30% thereof, the percentage being based on the epoxide groups, and in that the polycarboxylic anhydride (B) is incorporated in the form of a half ester and is other than phthalic anhydride or maleic anhydride.

In the polyesters according to the invention, conveniently at least 50% and preferably 80% to 100% of the epoxide groups of component (D) are esterified.

Examples of acid components for the starting polyester include phthalic acid, terephthalic acid, isophthalic acid, tetrahydro- and/or hexahydrophthalic acid, halophthalic acids such as tetrachloro- and tetrabromophthalic acid, and the endomethylene derivatives thereof, such as endomethylene tetrahydrophthalic acid, adipic acid, sebacic acid, fumaric acid, maleic acid or anhydrides of these acids, where they exist, optionally together with monocarboxylic acids such as benzoic acid, p-tert.butylbenzoic acid, lauric acid, isononanic acid, unsaturated or saturated fatty acids of naturally occurring oils, either individually or in admixture. Examples of alcohol components of these polyesters include polyhydric alcohols, such as ethylene glycol, the various propanediols, butanediols, pentanediols, hexanediols, neopentylglycol, diethyleneglycol, cyclohexanedimethanol, trimethylpentanediol, trimethylolethane or -propane, glycerol, pentaerythritol, dipentaerythritol, optionally together with monohydric alcohols, such as butanol, octanol, lauryl alcohol and linoleyl alcohol, either individually or in admixture. However, monofunctional compounds are generally only used in minor amounts relative to the acid or alcohol component.

Examples of polycarboxylic anhydrides include trimellitic anhydride, tetrahydrophthalic anhydride, hexahydrophthalic anhydride, halophthalic anhydrides, such as tetra- and hexachloro- or bromophthalic anhydride, and the endomethylene derivatives thereof such as hexachloroendomethylene-tetrahydrophthalic anhydride, succinic and glutaric anhydride; trimellitic anhydride and/or tetra- or hexahydrophthalic anhydride are preferred.

Amine bases for the formation of the salts of the COOH groups of the polyester resins according to the invention are, for example, those of formula

wherein $R^1$, $R^2$ and $R^3$ are identical or different and represent hydrogen, aralkyl with 7 to 9 carbon atoms, e.g. benzyl, alkyl with 1 to 8, preferably 1 to 5 carbon atoms, cycloalkyl with up to 6 carbon atoms, such as cyclohexyl or hydroxyalkyl with 1 to 5, preferably 1 to 3 carbon atoms, and morpholine compounds or quaternary ammonium hydroxides and/or salts of monocarboxylic acids with 1 to 5, preferably 1 to 3 carbon atoms. Examples include ammonia, trimethyl-, triethyl- and tributylamine; N-dimethylcyclohexylamine; N-dimethylbenzylamine; diethanolamine; and dimethylaminoethanol. In many cases, e.g. in order to obtain certain processing qualities, it may be necessary to use the salt-forming organic bases in an excess relative to the carboxyl group equivalents of the polyester. Amines containing one hydroxyl group are preferred.

Epoxy compounds (D) are conveniently derived from olefinically polyunsaturated fatty acids, for example from linoleic acid or linolenic acid and also from esters of olefinically monounsaturated fatty acids with polyhydric alcohols, such as those of oleic acid with glycerol. Epoxidised fatty acid derivatives include, for example, those of linseed oil, soya oil, alkyl esters of dehydrated castor oil fatty acid, soya oil and linoleic acid or arachidonic acid, oligomeric fatty acids and the esters thereof. Epoxidised linseed oil and soya oil are preferred. However, care must be taken to ensure that, in the one-step reaction with the polyepoxides, preferably only those polyepoxides are used which comprise, in addition to the epoxide groups, at least one ester group, optionally together with monoepoxides.

Examples of epoxidised aliphatic hydrocarbons include, for example, those with from 4 to 20, preferably 4 to 12 carbon atoms and an oxiran ring number (per molecule) of from 2 to 6, preferably from 2 to 4 and epoxidised polybutadiene oils, the C-alkylation products thereof, e.g. isoprene oils or homologues of these substances.

The proportion of epoxy compounds may be, for example, 5 to 40, preferably 10 to 30% by weight, based on the end product.

If necessary, the polyester may also contain at least one built-in monoepoxide. Monoepoxides which may be used for this purpose include, for example, epoxidised hydrocarbons, such as ethylene, propylene or butylene oxide, styrene oxide, cyclohexenevinyl monooxide, dipentenemonooxide, α-pinene oxide, and butylglycidyl ethers, allylglycidyl ethers, phenylglycidyl ethers, p-butylphenolglycidyl ethers, cresylglycidyl ethers, 3-(pentadecyl)-phenol-glycidyl ethers, and glycidyl esters such as those of saturated monocarboxylic acids singly or doubly branched in the α-position, or glycidyl methacrylate.

The invention also extends to a process for preparing the polyesters, which is characterised in that (a) in a first step, a polyester with an acid number of from 2 to 100, preferably 2 to 30, is prepared from an acid component containing (A) at least one dicarboxylic acid or an anhydride thereof, (D) at least one epoxy compound containing at least two oxiran rings, selected from the group consisting of epoxidised fatty acids, derivatives thereof and epoxidised aliphatic hydrocarbons, or a mixture thereof with up to 30% of monoepoxides, and (C) at least one alcohol component which contains at least one at least dihydric alcohol, (b) then, in a second step, if the polyester has an acid number of at least 15, it is reacted with a monoepoxide and/or with a polyepoxide which contains, in addition to the epoxy groups, at least one ester group, to form a polyester with an acid number of less than 15, and if the polyester already has an acid number of less than 15 it is optionally reacted, in a second step, with a monoepoxide and/or a polyepoxide which contains, in addition to the epoxy groups, at least one ester group, (c) the polyester formed in the first or second step and having an acid number of less than 15 is reacted with (B) at least one polycarboxylic monoanhydride other than phthalic anhydride and maleic anhydride, at a temperature of from ambient temperature to 170° C., preferably from 50° to 140° C., to form a half ester of the monoanhydride, (d) in a further step, the free COOH groups of the half ester formed are converted with an amine, preferably a tertiary amine or tertiary aminoalcohol, into the corresponding salt, and (e) the product obtained in (d) is recovered as such or diluted in a further step with a solvent, preferably water.

This process proceeds smoothly and the products prepared by the process surprisingly have the advantage of having relatively low susceptibility to hydrolysis when stored in an aqueous medium. Furthermore, they are compatible with water-soluble or water-dilutable mono- and polyepoxides and water-soluble amine resins.

Preferably, in step (c), the polyester is reacted with trimellitic anhydride and/or with an at least partially hydrogenated anhydride of an aromatic dicarboxylic acid, e.g. hexa- and/or tetrahydrophthalic acid.

The condensation in step (a) is generally effected at a temperature of at least 170, preferably from 190° to 230° C. This range is of interest since, in this range, the reaction between the carboxyl groups of the polycarboxylic acid (A) and the epoxide groups of the epoxy compound (D) proceeds smoothly and is completed. In this way, modified polyesters are formed wherein the epoxy compounds are incorporated in the polymer chain via the epoxy group.

Examples of polyepoxides for reaction in step (b) are those mentioned hereinbefore.

In a preferred embodiment of the invention, in the first step, a polyester may be prepared from the acid component and the alcohol component, according to feature (a), and an amount of the epoxy compound (D) in the form of a polyepoxide which comprises, in addition to the epoxide groups, at least one ester group, either alone or in admixture with at least one monoepoxide, the polyester having an acid number of less than 15. Then the process is continued, omitting step (b) and going on to step (c).

The polyesters may be diluted with water as required, without the addition of solvents and without flocculation occurring. Nevertheless, they are resistant to hydrolysis. Therefore, they may conveniently be presented in the form of an aqueous solution, possibly also in admixture with water-soluble or water-insoluble solvents. The aqueous solutions of the polyesters according to the invention are generally clear to milky-cloudy, and depending on their chemical composition they are low viscosity to high viscosity liquids with an excellent stability on storage. The solids content of these liquids may vary within wide limits. However, they may also be pasty in nature. They may be mixed with a high proportion of pigments and/or fillers. The polyesters have exceptionally good wetting properties.

Since the polyesters according to the invention or the products obtained by the process according to the invention are surprisingly compatible with special water-dilutable epoxides, particularly polyepoxides, either alone or combined with amine resins, particularly of the water-dilutable type, especially of the hexamethoxymethylmelamine or urea resin type or the like, they may be used as binders in aqueous or water-miscible media, either alone or combined with water-dilutable amine resins and/or water-dilutable epoxides. In particular, the polyesters according to the invention are compatible with modified epoxides of the kind which are free from glycidyl ester and glycidyl ether groups and which contain, in addition to at least one epoxide group, at least one ester group of a monocarboxylic acid and a further ester group adjacent thereto and formed by reacting an OH group with a polycarboxylic monoanhydride, whilst the second COOH group formed from the anhydride during esterification is present wholly or partially in the form of a salt of a base (cf. patent application Ser. No. 357,573 filed Mar. 12, 1982.

The weight ratio of the polyester resins according to the invention to the cross-linking partner, e.g. the water-dilutable amine resin and/or epoxide, may be varied within wide limits, e.g. from 99:1 to 1:99, preferably from 90:10 to 50:50. According to one embodiment of the invention, a cross-linking combination of the water-dilutable amine resins and the water-dilutable epoxides, preferably the polyepoxides in a weight ratio of from 90:10 to 10:90, more particularly from 50:10 to 10:50, is used.

By modifying the polyesters according to the invention and incorporating the epoxy compounds chemically, particularly valuable products are obtained which can be hardened, by the addition of suitable cross-linking agents, e.g. amine resins and/or water-dilutable epoxides, to form highly elastic, chemically resistant products with a high mechanical strength. These products are resistant, for example, to the effects of weathering, such as UV radiation, alkali and organic solvents, such as acetone, alcohols or aromatic solvents, such as benzene, toluene and xylene.

Using binders prepared from the polyesters according to the invention, it is possible to produce non-pigmented or pigmented coating compositions, e.g. paints or lacquers, which may also contain other fillers, and which, when hardened, yield coatings with excellent mechanical properties.

In particular, the polyesters according to the invention may be used for the production of hardened coatings, particularly those which are stoved at a temperature of above 60° C. In many cases, excellent cross-linking is obtained even under mild conditions, e.g. at only 60° to 120° C. and, naturally, certainly at higher temperatures, e.g. at above 120° C. The curing time may be shortened substantially by further increasing the temperature, e.g. to 140° to 190° C. The products according to the invention can also be cured under shock drying conditions such as are used in coil or can-coating processes, i.e. at temperatures of from 200° to 350° C. and in extremely short periods, e.g. from 10 seconds to 3 minutes, resulting in excellent coatings.

In order to accelerate the cross-linking process or reduce the curing temperatures, it may be appropriate to combine the mixture, if it contains water-dilutable epoxides, with a catalyst in an amount of up to 10% by weight, preferably from 0.01 to 5% by weight, based on the solids content. Examples of catalysts include basic catalysts such as diazabicyclooctane, diazabicyclononene or undecene, imidazole derivatives, such as 3-methyl-, 2-phenyl- or cyclohexylimidazole, trialkylamines, such as triethyl-, tributyl- or tricyclohexylamine, N-alkylpiperidines, N,N'-dialkylpiperazines, trialkyl- or triaryl-phosphines, N,N'-tetraalkylaminoalkyloxamides, alkyl esters of N-dialkylaminoalkyl-oxamido acid, and also amines, hydroxides, carbonates and salts with organic acids of alkali metals, such as lithium hydroxide, potassium cabonate, lithium benzoate and also the addition products thereof with crown ethers or similar ligands. However, alkali and/or alkaline earth salts of polymeric acids, as described in patent application Ser. No. 316,806 filed Nov. 2, 1981, and quaternary ammonium compounds, such as choline, tetrabutylammonium iodide, chloride, bromide, hydroxide, tetramethylammonium chloride, bromide, iodide or hydroxide, are also effective catalysts for the coating materials according to the invention.

A particular advantage of the invention is that, with systems based on the polyesters according to the invention, highly elastic coatings are obtained which have a substantially perfect surface, i.e. after the curing process they are free from bubbles, even when applied in fairly thick layers.

It is also possible to combine the polyesters according to the invention with polymer dispersions, e.g. dispersions of acrylic polymers containing hydroxyl groups and to cross-link them with water-dilutable amine resins and/or water-dilutable polyepoxides. Systems of this kind may also readily be processed to form hardened coatings with a substantially flawless appearance and excellent lacquering properties.

The compositions based on the polyesters according to the invention, thus consisting of the polyesters and the modified epoxides and/or the amine resins as cross-linking agent, may be applied to all kinds of substrates provided that these substrates will withstand the curing temperatures of the coating. Suitable substrates include, for example, ceramics, wood, glass, concrete, plastics, and preferably metals, such as iron, zinc, titanium, copper, aluminum steel, brass, bronze, magnesium or the like, whilst these substrates may optionally be made more adhesive or resistant to corrosion by suitable mechanical and/or chemical pre-treatment. However, the coatings according to the invention adhere extremely well to all kinds of metal surfaces without any adhesion-promoting priming or intermediate coatings. The good adhesion of these coatings corresponds to the values GT OA to GT 1A according to the test specifications of DIN 53 151.

The aqueous polyester compositions according to the invention are suitable for the preparation of corrosion-proofing coatings and/or intermediate coatings for all kinds of applications, more particularly as resistant coatings and matt coatings. Furthermore, they are suitable for coating and lining objects which come into contact with propellants and solvents, and also for protective coatings guarding against atmospheric effects, such as components for electrical purposes or the elements thereof, particularly for electric conductors, and coatings for objects exposed to thermal stress.

In view of their favourable properties, the polyester compositions according to the invention are also exceptionally suitable for one-coat painting. Depending on the choice of components, metal sheets coated with the agents according to the invention may subsequently be deformed or shaped by deep drawing, bending, profiling, stamping or the like without any appreciable effect on the other favourable properties. The coating layer adhering thereto may be left as it is or may be used as an intermediate layer, i.e. as an undercoat for other coatings, which may in turn consist of the same or some conventional coating material.

The coatings obtained may be used, as desired, to produce glossy or matt films with excellent chemical and mechanical resistance and good resistance to weathering. On the other hand, it is also possible to produce matt lacquers with exceptional mechanical and chemical properties. Surprisingly, these do not require a large amount of pigments or fillers.

A further use for the polyester compositions according to the invention described above is as a cross-linkable resin with an emulsifying effect or as protective colloids, thickeners or thixotropic agents for aqueous dispersions and synthetic resins. Owing to their good dilutability and other favourable properties, these compositions are also suitable for use in paint application by electrodeposition.

Another possibility is the use of the polyester compositions according to the invention for water-dilutable adhesives. They may also be used as binders for textile, organic and/or inorganic materials. They are also suitable for use for hardenable moulding compositions, casting resins, cements, cellular or porous materials such as foams and as insulating lacquers.

The following Examples serve to illustrate the invention. In the Examples, T represents parts by weight, % represents percent by weight, SZ represents acid number and OHZ represents hydroxyl number, unless otherwise stated. As the monoepoxide, a glycidyl ester of a monocarboxylic acid with 10 to 12 carbon atoms, branched in the α-position, is used in the reactions.

EXAMPLES

(I) Preparation of the polyester (1A) In a 2 liter glass flask, fitted with a reflux condenser, water separator, stirrer, contact thermometer and heating device, 732 T of phthalic anhydride, 572 T of neopentylglycol, 55 T of trimethylolpropane, 130 T of epoxidised soya oil with an epoxy equivalent weight of 260, and 80 to 100 T of toluene were introduced and heated to 220° C., with gentle refluxing, under an inert gas atmosphere. After about 8 hours' operation, a polyester was obtained with SZ 15.

The mixture was then cooled to 120° C. and, after the toluene had been distilled off, 96 T of monoepoxide were added. After another 4 hours at 120° C., the reaction mixture was cooled to ambient temperature. The SZ of the product was now <2.

(B) In a 2 liter glass flask provided with a reflux condenser, contact thermometer, heating device and stirrer, 300 T of the polyester obtained in (A) and 28.1 T of trimellitic anhydride were heated to 120° to 130° C. for 3 to 4 hours under an inert gas atmosphere until an acid number of about 50 was obtained. The mixture was then cooled to 90° C. and mixed with 22.7 T of dimethylaminoethanol. The reaction mixture was then diluted with 350 T of deionised water. A clear solution was obtained, pH=6.1, solids content 50%.

(2) In the reaction vessel used in Example (1A), 722 T of phthalic anhydride, 578 T of neopentylglycol, 36.7 T of trimethylolpropane and 173.2 T of epoxidised soya oil (see Example (1A)) were reacted using the same method as in Example (1A). A polyester was obtained with SZ 14.

After reaction with 89 T of monoepoxide, the polyester has an SZ of <2. 600 T of this polyester were reacted as in Example (1B) with 56.2 T of trimellitic anhydride to give an SZ of 51. Then salt formation was effected with 45.4 T of dimethylaminoethanol. The product was diluted with water to give a 55% clear resin solution, pH 7.

(3) 682 T of phthalic anhydride, 579 T of neopentylglycol, 37 T of trimethylolpropane and 173 T of epoxidised soya oil (see Example (1A)) were reacted as in Example (1A) to give an SZ of 15. Then the product was reacted with 94 T of monoepoxide to give a polyester of SZ 1.6. 600 T of this polyester were reacted with 56 T of trimellitic anhydride as in Example 1B). The product (SZ 51) was then converted into a salt with 46 T of dimethylaminoethanol and adjusted with deionised water to a solids content of 55%. The aqueous polyester solution was clear, pH 6.6.

(4) A polyester with an SZ of <2, OHZ 107, was prepared as in Example 1 from 722 T of phthalic anhydride, 579 T of neopentylglycol, 75 T of trimethylolpropane, 251 T of epoxidised soya oil (see Example (1A)) and 105 T of monoepoxide.

600 T of this polyester were reacted with 56 T of trimellitic anhydride as in Example (1B). The reaction mixture (SZ 50) was then converted into a salt with 46 T of dimethylaminoethanol and adjusted to a solids content of 55% with deionised water. The aqueous polyester solution is clear, pH 7.6.

(5) 722 T of phthalic anhydride, 579 T of neopentylglycol, 150 T of trimethylolpropane, 251 T of epoxidised soya oil (see Example (1A)) and 108 T of monoepoxide were reacted to give a polyester with a SZ 2, OHZ 168. 600 T of this polyester were reacted with 56 T of trimellitic anhydride as in Example (1B). The product had an SZ of 51. Then salt formation was effected using 45 T of dimethylaminoethanol. Using deionised water, the product was adjusted to a solids content of 55%. The resin solution was clear, pH 7.2.

(6) A polyester, SZ 12.5, was prepared from 762 T of phthalic anhydride, 667 T of neopentylglycol, 317 T of isoalkylepoxy stearate (epoxy equivalent weight=500) and then reacted with 100.9 T of monoepoxide to form a product of SZ<2, OHZ 93. 300 T of this polyester were reacted as in Example 1 with 31 T of trimellitic anhydride to yield a polyester of SZ 56. Then salt formation was effected using 23 T of dimethylaminoethanol. The product was diluted to a 50% solids content with deionised water. The polyester solution was opaque to slightly cloudy, pH=6.4.

(7) A polyester of SZ 16.1 was prepared as in Example (1A) from 732 T of phthalic anhydride, 572 T of neopentylglycol, 27.5 T of trimethylolpropane, 20.9 T of pentaerythritol, 130 T of epoxidised soya oil (see Example 1), and then further reacted with 102 T of monoepoxide to give an SZ of <2. 300 T of this polyester were reacted as in Example 1 with 28 T of trimellitic anhydride to give a product with SZ 48. Then salt formation was effected with 22.7 T of dimethylaminoethanol. The product was diluted with deionised water to give a solids content of 50%. The polyester solution was opaque to slightly cloudy, pH=7.5.

(8) As in Example 1, a polyester of SZ 14 was prepared from 732 T of phthalic anhydride, 572 T of neopentylglycol, 55 T of trimethylolpropane and 130 T of epoxidised linseed oil (epoxy equivalent weight 179), and then reacted with 89 T of monoepoxide to give an SZ of <2. 300 T of this polyester were reacted as in Example 1 with 28 T of trimellitic anhydride. The product was further processed according to Example 7. The 55% aqueous polyester solution was cloudy, pH 6.9.

(9) 600 T of the monoepoxide reaction product of Example 3 were reacted as in Example (1B) with 89 T of hexahydrophthalic anhydride to give an SZ of 49. Then salt formation was effected with 44 T of dimethylaminoethanol. The product was diluted with deionised water to give a solids content of 55%. The aqueous polyester solution was opaque to slightly cloudy, pH 7.1.

(10) 600 T of the monoepoxide reaction product of Example 2 were reacted as in Example (1B) with 60.2 T of succinic anhydride. The reaction mixture, SZ 50.8, was converted into a salt with 45 T of dimethylaminoethanol and adjusted to a solids content of 55% with deionised water. The aqueous polyester solution was opaque to slightly cloudy, pH 7.3.

(11) As in Example 1, a polyester with an SZ of 14.5 was prepared from 732 T of phthalic anhydride, 572 T of neopentylglycol, 55 T of trimethylolpropane and 134 T of epoxidised polybutadiene oil (epoxy equivalent weight=267), and then reacted with 97 T of monoepoxide to give a product with an SZ<2. 300 T of this product were reacted with 28.3 T of trimellitic anhydride as in Example 1. The reaction product, SZ 51.2, was then converted into a salt with 23 T of dimethylaminoethanol and adjusted to a solids content of 50% with deionised water. The aqueous polyester solution was opaque to slightly cloudy, pH 6.3.

(12A) 702 T of phthalic anhydride, 579 T of neopentylglycol, 75 T of trimethylolpropane, 211 T of epoxidised soya oil with an epoxy equivalent weight of 260 and 80 to 100 T of toluene were measured into a 2 liter glass flask fitted with a reflux condenser, water separator, stirrer, contact thermometer and heating apparatus and heated to 200° C. with gentle refluxing, under an inert gas atmosphere, until the acid number was about 15. (Reaction time: about 11 to 12 hours).

Then 110 T of epoxidised soya oil with an epoxy equivalent weight of 260 were added. After another 4 hours at 200° C., the reaction mixture was cooled to ambient temperature. The acid number of the product was then about 4.

(B) In a 2 liter glass flask, fitted with a reflux condenser, contact thermometer, heating device and stirrer, 700 T of the polyester obtained in (A) and 60 T of trimellitic anhydride were heated to 120° to 130° C., under an inert gas atmosphere, for 3 to 4 hours, until an acid number of about 50 had been achieved. Then the mixture was cooled to 90° C. and mixed with 53 T of dimethylaminoethanol. The reaction mixture was then diluted with 663 T of deionised water. A clear solution was obtained, pH=6.9, solids content 55%.

(13) In a reaction vessel as in Example (12A), 722 T of phthalic anhydride, 579 T of neopentylglycol, 75 T of trimethylolpropane and 211 T of epoxidised soya oil (see Example 12A) were reacted using the same method as in that Example. A polyester was obtained with the acid number 13.7.

After reaction with 110 T of epoxidised soya oil using the same procedure as in Example (12A), the polyester had an acid number of 4.

700 T of this polyester were reacted as in Example (12B) with 60 T of trimellitic anhydride to give an acid number of 51. Then salt formation was effected with 52.8 T of dimethylaminoethanol. The product was diluted with deionised water to give a 50% solution, pH 6.5.

(14) In a reaction vessel as in Example (12A), 702 T of phthalic anhydride, 579 T of neopentylglycol, 75 T of trimethylolpropane and 291 T of epoxidised soya oil (see Example 12A) were reacted using the same procedure as in that Example. A polyester was obtained with an acid number of 15.

After the reaction with 111 T of epoxidised soya oil using the same procedure as in Example (12A), the polyester had an acid number of 5.6.

700 T of this polyester were reacted as in Example (12B) withh 58 T of trimellitic anhydride to give an acid number of 50. Then salt formation was effected with 53 T of dimethylaminoethanol. The product was diluted with deionised water to give a 55% solution, pH 6.4.

(15) 722 T of phthalic anhydride, 579 T of neopentylglycol, 75 T of trimethylolpropane, 211 T of epoxidised soya oil (see Example 12A) and 82 T of dehydrated castor oil fatty acid were reacted using the same procedure as in Example (12A). A polyester was obtained with the acid number 15.4.

After reaction with a further 110 T of epoxidised soya oil using the same procedure as in Example (12A), the polyester had an acid number of 6.8.

700 T of this polyester were reacted as in Example (12B) with 56 T of trimellitic anhydride to give an acid number of 52. Then salt formation was effected with 53 T of dimethylaminoethanol. The product was diluted with deionised water to give a 55% solution, pH 6.8.

(16) In a reaction vessel as in Example (12A), 722 T of phthalic anhydride, 579 T of neopentylglycol, 75 T of trimethylolpropane, 211 T of epoxidised soya oil (see Example 12A) and 82 T of isononanic acid were reacted as in Example (12A). A polyester was obtained with the acid number 15.7.

After reaction with 110 T of epoxidised soya oil using the same procedure as in Example (12A), the polyester had an acid number of 4.3.

700 T of this polyester were reacted as in Example (12B) with 60 T of trimellitic anhydride to give an acid number of 49.4. Then salt formation was effected with 53 T of dimethylaminoethanol. The product was diluted with deionised water to give a 50% solution, pH 6.7.

(17) 682 T of phthalic anhydride, 579 T of neopentylglycol, 75 T of trimethylolpropane and 321 T of epoxidised soya oil with an epoxy equivalent weight of 260 and 80 to 100 T of toluene were measured into a reaction vessel as in Example (12A) and heated to 220° C. with gentle refluxing under an inert gas atmosphere. After a reaction period of 24 hours, the reaction mixture was cooled to ambient temperature. The acid number of the polyester (after the elimination of toluene) was then 4.9.

600 T of polyester were reacted with 51 T of trimellitic anhydride as in Example (12B) to give an acid number of 49.8. Then salt formation was effected with 45 T of dimethylaminoethanol. The product was diluted with deionised water to give a 55% solution, pH 6.6.

In the Examples which follow a 50% polyester solution was used in each case.

A 40% solution of an epoxide, preferably a polyepoxide, was used in each case as the epoxide component. This was a modified epoxide free from glycidyl ester and ether groups and wherein the second COOH group was wholly or partially present in the form of a salt with a base, as described in patent application Ser. No. 357,573 filed on even date herewith.

The melamine resin consists of hexamethoxymethyl melamine.

(II) Preparation of coatings (18) to (24), (27) to (29) and (32) to (40)

According to Examples (18) to (24), (27) to (29) and (32) to (40) (see Table 1) the following procedure is used:

The specified quantity of solution of the polyester accordiang to the invention was mixed with the specified quantity of an aqueous solution of polyepoxide. Then the quantity of titanium dioxide corresponding to the total solids content of the mixture was added and the mixture was triturated in a bead mill. The mixture was then combined with melamine resin, homogenised and then adjusted to a spray viscosity of 18s in a 4 mm DIN cup, with deionised water. After being left to stand for 3 days, the coating compositions were sprayed onto phosphated steel sheets by means of spray guns.

The coated test sheets were first dried in the air for 20 minutes at ambient temperature. Then curing was effected under the curing conditions given in Table 2.

(25) and (30)

An analogous procedure was used in Examples 25 and 30, except that the pigment was dispersed only in the polyester resin medium. In each case, the dry film thickness of the coatings was about 40 μm.

(26) 50 T of the 50% polyester solution of Example 3 were mixed with 62.5 T of the aqueous epoxide solution according to Example 1 of patent application Ser. No. 357,573 filed Mar. 12, 1982, and the pH was adjusted to 8.0 with dimethylaminoethanol. Then 100 T of titanium dioxide were added. The mixture was triturated in a bead mill. Then 100 T of a 50% acrylate dispersion containing hydroxyl and carboxyl groups, based on butyl acrylate, methyl methacrylate, hydroxyethyl acrylate and acrylic acid, together with 10 T of hexamethoxymethylmelamine were added. The mixture was adjusted with deionised water to an outflow time of 18s in the 4 mm DIN cup and sprayed on to steel sheets (Erichsen sheets).

(31) The coating composition was prepared as in Example 12, and subsequently adjusted with deionised water to an outflow time of 90s in the 4 mm DIN cup. The coating material was applied in a wet film thickness of 100 μm to phosphated sheets, using a spiral applicator, and shock-dried at 300° C. for 1 minute in the circulating air drier, without any natural drying period.

(41) (Two-coat metal effect coating)
First a mixture of 150 T of a 50% polyester solution as in Example 4, 100 T of a 40% aqueous epoxide solution as in Example 8 of patent application Ser. No. 357,573 filed Mar. 12, 1982 and 29 T of aluminum pigment was prepared and diluted with deionised water to give an outflow time of 15s in the 4 mm DIN cup.

This solution was sprayed in a wet layer thickness of about 100 μm onto steel sheet, as a primer, and hardened at 110° C. for 30 minutes, after about 15 minutes' drying in the air. After the primer had cooled, a clear covering layer consisting of a mixture of 110 T of the 50% polyester mixture according to Example 3 and 15 T of hexamethoxymethylmelamine was adjusted with deionised water to give an outflow time of 18s in the 4 mm DIN cup, then sprayed onto the primer and cured for 30 minutes at 140° C. after 10 minutes' drying in the air. A flawless, highly glossy and scratch-resistant two-coat metal effect lacquer was obtained.

TABLE 1

| Example No. | 50% aqueous polyester resin solution T | according to Example | Aqueous epoxide solution T | according to Example* | Melamine resin T | Catalyst T | Structure |
|---|---|---|---|---|---|---|---|
| 18 | 160 | 1 | 50 | 6 | 30 | | — |
| 19 | 150 | 2 | 50 | 11 | 20 | 0.5 | Choline |
| 20 | 160 | 3 | 75 | 10 | 30 | 0.5 | LiOH.1 H$_2$O |
| 21 | 160 | 4 | 50 | 11 | 20 | 1 | Choline |
| 22 | 145 | 5 | 90 | 8 | | 0.5 | Tetrabutyl-ammonium-hydroxide |
| 23 | 120 | 3 | 75 | 4 | 30 | | — |
| 24 | 140 | 4 | 75 | 11 | | 0.5 | Tetramethyl-ammonium-hydroxide |
| 25 | 140 | 4 | | | 30 | | — |
| 26 | 50 | 3 | 62.5 | 1 | 10 | | |
| 27 | 120 | 11 | 37.5 | 8 | 20 | 0.5 | LiOH.1 H$_2$O |
| 28 | 170 | 10 | 80 | 10 | 15 | | — |
| 29 | 164 | 9 | 53 | 12 | 15 | | — |
| 30 | 160 | 8 | | | 35 | | — |
| 31 | 160 | 3 | 55 | 10 | 30 | 0.5 | LiOH. 1 H$_2$O |
| 32 | 160 | 12 | 50 | 8 | 30 | — | — |
| 33 | 160 | 13 | 50 | 10 | 30 | — | — |
| 34 | 180 | 14 | 25 | 9 | 25 | 1 | Tetrabutyl-ammonium-hydroxide |
| 35 | 160 | 12 | 50 | 12 | 20 | — | — |
| 36 | 160 | 15 | 50 | 8 | 30 | 1 | p-toluene-sulphonic acid |
| 37 | 160 | 15 | 50 | 8 | 30 | — | — |
| 38 | 160 | 16 | 50 | 10 | 30 | 1 | p-toluene-sulphonic acid |
| 39 | 160 | 16 | 50 | 10 | 30 | — | — |
| 40 | 160 | 17 | 50 | 8 | 30 | — | — |

*from the specified Examples in Patent Application (corresponding to German Patent Application P 31 09 900.9)

(III) Technical coating test
In Table 2, the curing conditions and test values obtained are assembled.

In addition to the test values listed in Table 2, a value of T$_1$ was determined after shock hardening in the T-bend test and a pencil hardness of 2H (ECCA standard) was determined for Example 25.

(IV) Discussion of the results
As the values in Table 2 show, all the Examples yield coatings with good technical properties. Depending on the combination of polyesters and polyepoxide chosen, a very high surface hardness is obtained (see Examples 20, 25, 30, 32, 33, 38) and very high density of cross-linking and hence good chemical resistance (see Examples 20, 25, 31 and 35). Moreover, the values for all the cross-linked samples show good impact deformation, which is exceptionally high for certain special combinations (see Examples 24, 27, 31, 36, 37 and 39). In spite of a hardening time of only 1 minute, coatings with high surface hardness and good deformability are obtained according to Example 25.

TABLE 2

| Example No. | Curing conditions min | Curing conditions °C. | Gloss according to Lange 60° s | Pendulum hardness according to Konig s | Resistance to Xylene min. | Resistance to 10% NaOH h | Erichsen cupping mm | Impact cupping reverse inch. pound | Lattice cut 0 = best value 5 = worst value |
|---|---|---|---|---|---|---|---|---|---|
| 18 | 30 | 140 | 88 | 135 | 8 | 24 | 9.7 | 40 | 0-1 |
| 19 | 30 | 130 | 86 | 156 | 10 | 20 | 10.2 | 100 | 0 |
| 20 | 30 | 160 | 82 | 192 | >30 | >48 | 8.2 | 60 | 1 |
| 21 | 30 | 90 | 85 | 145 | 11 | 7 | 9.6 | 44 | 0 |
| 22 | 30 | 130 | 82 | 120 | 2 | 2 | 10.5 | 80 | 0-1 |
| 23 | 30 | 160 | 89 | 170 | 12 | 24 | 10.8 | 120 | 0 |
| 24 | 30 | 120 | 88 | 160 | 3 | 8 | 9.5 | 160 | 0-1 |
| 25 | 20 | 150 | 87 | 179 | >30 | 24 | 8.7 | 100 | 0 |
| 26 | 30 | 140 | 88 | 160 | 20 | >72 | 8.0 | 20 | 1 |
| 27 | 30 | 130 | 82 | 135 | 25 | 6 | 10.1 | 140 | 0 |
| 28 | 30 | 140 | 87 | 181 | 21 | 48 | 9.7 | 60 | 0-1 |
| 29 | 30 | 160 | 85 | 157 | 25 | 36 | 7.9 | 40 | 1 |
| 30 | 30 | 150 | 88 | 189 | 30 | 48 | 8.3 | 60 | 1 |
| 31 | 1 | 300 | 82 | 169 | >30 | 36 | metal sheet torn | 160 | 0-1 |
| 32 | 30 | 140 | 86 | 187 | 15 | 24 | 9.6 | 80 | 0 |
| 33 | 30 | 140 | 88 | 185 | 18 | 22 | 9.1 | 80 | 1 |
| 34 | 30 | 140 | 89 | 134 | 12 | 24 | 8.7 | 60 | 0-1 |
| 35 | 30 | 140 | 83 | 191 | >30 | >48 | 6.5 | 20 | 2 |
| 36 | 30 | 140 | 83 | 174 | 20 | 36 | 8.5 | 140 | 1 |
| 37 | 30 | 140 | 87 | 162 | 12 | 24 | 9.8 | 160 | 0 |
| 38 | 30 | 140 | 81 | 179 | 22 | 20 | 7.2 | 120 | 1 |
| 39 | 30 | 140 | 82 | 165 | 14 | 18 | 8.9 | 140 | 0 |
| 40 | 30 | 140 | 89 | 181 | 16 | 24 | 9.1 | 80 | 0 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A water-dilutable polyester having a good resistance to hydrolysis in which free COOH-groups are at least partially present in the form of ammonium salts, derived from
   (A) at least one dicarboxylic acid unit;
   (B) at least one polycarboxylic monoanhydride being built-in in the form of a half-ester and different from phthalic anhydride and maleic anhydride;
   (C) at least one alcohol component containing an at least dihydric alcohol and
   (D) at least one epoxy compound having at least two oxiran rings and being selected from the group consisting of epoxidized fatty acids, derivatives thereof, epoxidizid aliphatic hydrocarbons and mixtures thereof with monoepoxides.

2. A polyester as claimed in claim 1 wherein an amount of at least 50% of the epoxy groups of compound (D) is esterified.

3. A process for the preparation of a polyester as claimed in claim 1 which comprises
   (a) reacting in a first step (A) at least one dicarboxylic acid unit with (D) at least one epoxy compound having at least two oxiran rings, selected from the group consisting of epoxidized fatty acids, derivatives thereof, epoxidized aliphatic hydrocarbons and mixtures thereof with monoepoxides and (C) at least one alcohol component comprising an at least dihydric alcohol to form a polyester having an acid number between 2 and 100,
   (b) reacting in a second step any polyester obtained in step (a) having an acid number of at least 15 with an epoxy compound selected from the group consisting of a monoepoxide, a polyepoxide and a combination of both, said epoxide containing additionally at least one ester group, to form a polyester having an acid number below 15,
   (c) reacting the polyester having an acid number below 15 obtained in step (a) or (b) with (B) at least one polycarboxylic monoanhydride, different from phthalic anhydride and maleic anhydride, between ambient temperature and 170° C., thus forming a half-ester of the monoanhydride.
   (d) converting free COOH—groups of the half-ester obtained in step (c) with an amine to the ammonium salt and
   (e) separating the product of step (d) or diluting said product with a suitable solvent.

4. A process as claimed in claim 3 wherein in step (c) the polyester is reacted with component (B) selected from the group consising of trimellitic anhydride, an at least partially hydrogenated anhydride of an aromatic dicarboxylic acid and a combination of both.

5. A process as claimed in claim 3 wherein the polyester condensation in step (a) is performed at a temperature of at least 170° C.

6. A process as claimed in claim 3 wherein in step (a) a polyester is prepared from the acid component, the alcohol component and such an amount of the epoxide compound (D) in the form of a polyepoxide containing epoxy groups and at least one ester group, alone or in combination with a monoepoxide, to form a polyester having an acid number below 15, and subsequently the reaction is continued in step (b) or, under omission of step (b), in step (c).

7. A coating composition comprising a polyester as claimed in claim 1 alone or in combination with at least one water-dilutable substance selected from the group consisting of an amino resin and an epoxide.

8. A composition as claimed in claim 7 containing the polyester in combination with (α) at least one water-dilutable epoxide being free from glycidyl ester and ether groups, containing at least one epoxy group and at least one ester group of a monocarboxylic acid and a further ester group being vicinally arranged to said first ester group which second ester group has been formed by reaction of an OH—group with a polycarboxylic monoanhydride, the second COOH—group which has been formed from the anhydride by the partial esterification being at least partially present in the form of a salt of a base of with (β) a combination of that defined in (α) with a water-dilutable amino resin.

9. A composition as claimed in claim 8 in combination with a polymer dispersion.

10. An article coated with a coating composition as claimed in claim 7.

11. A polyester as claimed in claim 1 wherein the epoxy compound used is a mixture containing up to 30% of a monoepoxide, the percentage being referred to the total of epoxide groups.

* * * * *